(12) United States Patent
Bell et al.

(10) Patent No.: US 6,404,824 B1
(45) Date of Patent: Jun. 11, 2002

(54) APPARATUS AND METHOD TO REDUCE POWER AMPLIFIER NOISE GENERATION IN A MULTIPLEXED COMMUNICATION SYSTEM

(75) Inventors: Eddy Kent Bell, Round Rock, TX (US); Stephen T. Janesch, Coopersburg, PA (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/212,744

(22) Filed: Dec. 16, 1998

(51) Int. Cl.[7] .................................................. H04B 1/44

(52) U.S. Cl. ........................ 375/297; 370/278; 370/282; 455/83; 455/127

(58) Field of Search .................................. 375/219, 297; 370/278, 282, 318; 455/78, 82, 83, 550, 127, 129

(56) References Cited

U.S. PATENT DOCUMENTS

| | | | |
|---|---|---|---|
| 5,642,378 A | * | 6/1997 | Denheyer et al. ............ 375/216 |
| 6,205,171 B1 | * | 3/2001 | Yang et al. .................. 375/219 |
| 6,272,327 B1 | * | 8/2001 | Kurchuk et al. ............ 455/217 |

* cited by examiner

*Primary Examiner*—Amanda T. Le
(74) *Attorney, Agent, or Firm*—Skjerven Morrill MacPherson LLP

(57) ABSTRACT

In order to reduce the noise components in a multiplexed communication system, noise components generally referred to as splatter that from the rapid transition between the transmitting state and the non-transmitting state, this power transition in the transmitted signal is provided with a ramped envelope. In the preferred embodiment, the ramped power transition is the result of a ramped enabling signal applied to the power amplifier generating the transmitted signal. The use of a ramped power transition reduces the noise introduced as a result of an abrupt power transition. In addition, the transmitted signal is provided with a preamble so that no data is transmitted during the transition period.

16 Claims, 6 Drawing Sheets

APPARATUS AND METHOD TO REDUCE POWER AMPLIFIER NOISE GENERATION IN A MULTIPLEXED COMMUNICATION SYSTEM

BACKGROUND OF THE INVENTION

1. Field of the Invention

This invention relates generally to multiplexed communication systems and, more particularly, to noise generated by rapid change in transmitted power during the interval reserved for the transmission of information. This noise is generally referred to as splatter.

2. Description of the Related Art

A typical communication system 10 using time division multiplex techniques is shown in FIG. 1A. An antenna 101 is coupled to a two position switch 102. When the switch 102 is coupled to a first terminal, the signal received by the antenna 101 is applied to low noise amplifier 103. The output signal from the low noise amplifier 103 is applied to mixer unit 104. The mixer unit 104 also receives a signal from the local oscillator unit 105. The signals from the low noise amplifier 103 and the local oscillator unit 105 are combined in mixer unit 104 and applied to filter unit 106. The filtered signal from filter unit 106 is applied to an IF (intermediate frequency) unit 107. The output signal from the IF unit 107 is applied to demodulation unit 108. The demodulation unit 108 recoveries the data (information) that has been encoded in the transmitted signal and applies the data to an output terminal. When the switch unit 102 is in the second position, the output signal from power amplifier is applied to the antenna for transmission of information. The power amplifier 109 receives signals from mixer unit 110. The mixer unit 110 combines signals from the local oscillator unit and from a unit (not shown) that has encoded an intermediate signal with data to be transmitted. Typically, the intermediate frequency is fixed. However, the local oscillator unit 105 has a controllable voltage and can be implemented, for example, by a voltage controlled oscillator.

Referring to FIG. 1B, the operation of the time division multiplex system 10, operating in a duplex mode of operation is illustrated. For purposes of the operation of the time division multiplex system, time can be divided into a series of equal intervals. During alternate intervals, the system is transmitting, i.e., switch 102 has coupled the antenna 101 to the power amplifier 109. During the alternate intervals when the system 10 is not transmitting, the switch 102 couples the antenna 101 to the low noise amplifier 103. During these alternate intervals, the system is in a receiving mode. Thus, the system alternately transmits data and receives data. This mode of operation is referred to as multiplexing.

One of the problems that arises with a multiplexing mode of operation is the noise introduced by the rapid switching from a power-off mode to a power-on mode. In the idealized square wave form illustrated in FIG. 1B, the rapid change in the transmitted signal introduces frequency harmonics. These harmonics represent noise in the transmitted signal. The noise interferes with the detection and demodulation of the transmitted signal.

Referring to FIG. 2A, a portion of the apparatus shown in FIG. 1A is reproduced. In addition, an enabling signal $TX_{EN}$ that controls the transmission/reception cycle is shown. The enabling signal $TX_{EN}$ controls both the position switch 102, activates and inactivates the power amplifier 109, and can be applied to the mixer unit 110. The enabling signal $TX_{EN}$ determines, by controlling switch 102, whether the communication system is in a transmission mode or in a reception mode. By turning activating the power amplifier only when the switch is in the transmission mode, the leakage signal into the reception portion of the communication system can be reduced. Finally the application of the signal to the mixer unit 110 symbolically illustrates the point that the encoded carrier signal is not transmitted continuously. Therefore, the availability of the encoded of the carrier signal must be synchronized with the activation of the power amplifier 109.

Referring to FIG. 3A and FIG. 3B, the problem of noise generated by rapid transitions from a power-off to power-on mode of the power amplifier is illustrated. In FIG. 3A, a recording of a measurement by a spectrum analyzer, taken at the antenna port of the communication system 10, is shown. The center frequency of the spectrum analyzer is set to the same frequency as the frequency of the signal transmitted by system 10 (in this measurement, that frequency was 902 MHz). The recording shows the envelope of the pulsed radio frequency energy. The envelope is not filtered. The abruptly rising leading edge of the transmitted signal is clearly visible. The result of not filtering the transmitted signal is shown in FIG. 3B. In the recording of FIG. 3B, the center frequency of the spectrum analyzer is set to 905 MHz, 3 MHz, above the center frequency of the transmitted signal. An energy spike is seen that is coincident with the rising edge of the transmitted signal. (As will be clear to those skilled in the art, a similar spike would be measured at 3 MHz below the center frequency of the transmitted signal.) These energy spikes result in interfering noise energy that degrades the performance of the communication system in the broadcast band for which the communication system 10 is intended.

A need has been felt for apparatus and an associated method that features a reduction in the noise associated with the abrupt transition in transmitted power found in multiplexed communication systems. The apparatus and associated method would further feature procedures for increasing the integrity of the data in the presence of the power transition.

SUMMARY OF THE INVENTION

The aforementioned and other features are accomplished, according to the present invention, by providing a ramped transmitted signal. The transmitted signal is provided with a ramped profile by using a ramped enabling signal to switch the power amplifier from an off state to an on state. The ramped transmitted signal reduces the noise resulting from abrupt leading edge of transmitted signal, but results in diminished amplitude of the transmitted signal during the initial enabling of the power amplifier. In order to avoid loss of information during the transition period, the transmitted data is provided with a preselected preamble that does not include encoded data.

BRIEF DESCRIPTION OF THE DRAWINGS

The present invention may be better understood, and its numerous objects, features, and advantages made apparent to those skilled in the art by referencing the accompanying drawings.

FIG. 1A is a block diagram of a time division multiplex unit, while

FIG. 2A power is block diagram of the apparatus controlling the signal transmission, while

FIG. 4A illustrates the signal activating the power amplifier according to the present invention, while

The use of the same reference symbols in different drawings indicates similar or identical items.

DESCRIPTION OF THE PREFERRED EMBODIMENT(S)

FIG. 1A, FIG. 1B, FIG. 2A, FIG. 2B, FIG. 3A and FIG. 3B have been described in relationship to the prior art.

Figure 1A:
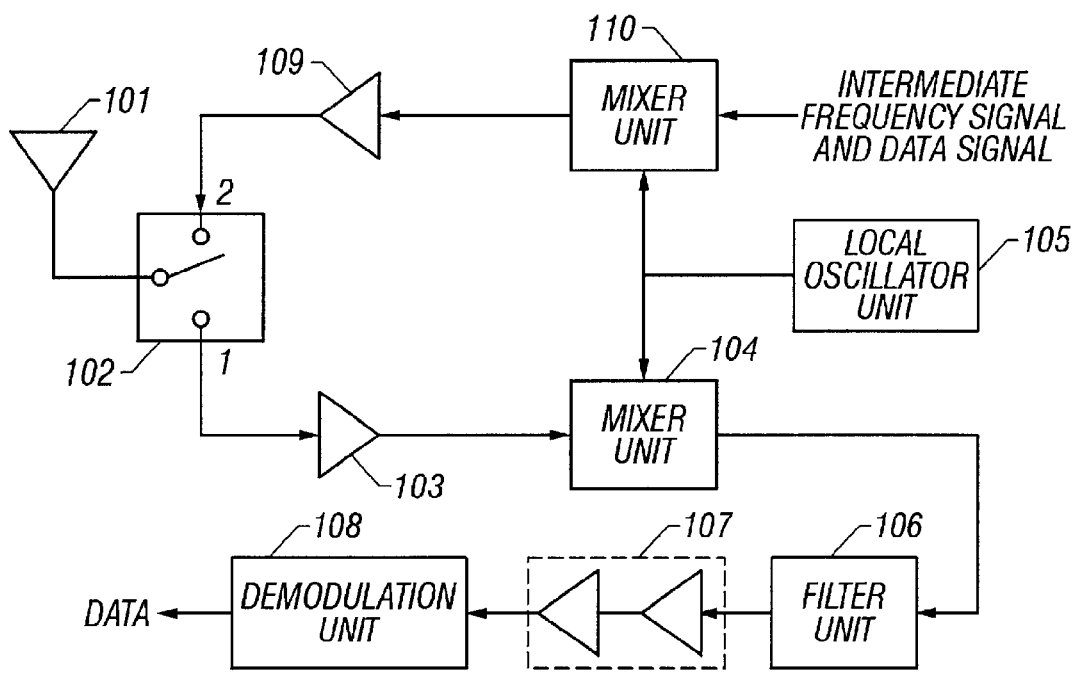
Figure 1B:
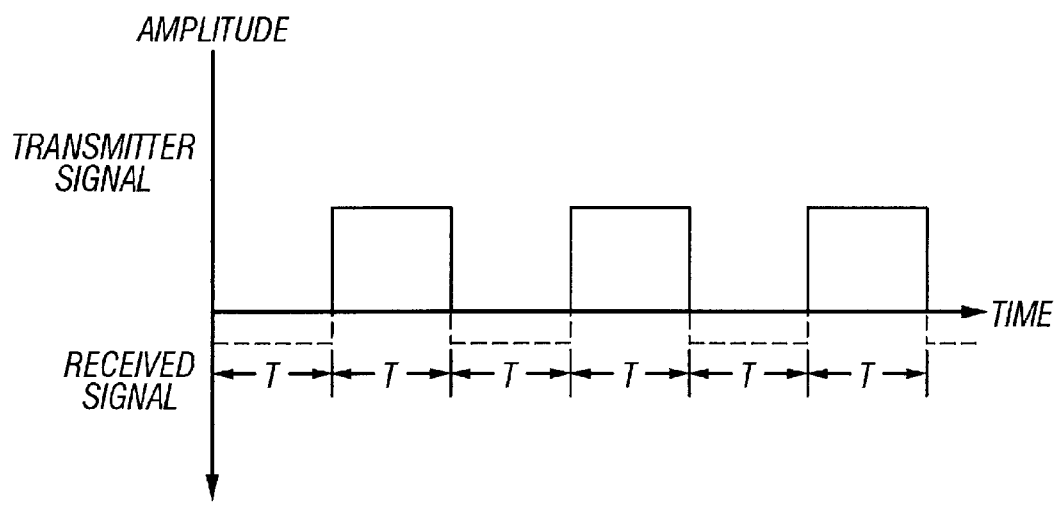
FIG. 1B illustrates the multiplexing of the transmitted and received signal according to the prior art.
Figure 2A:
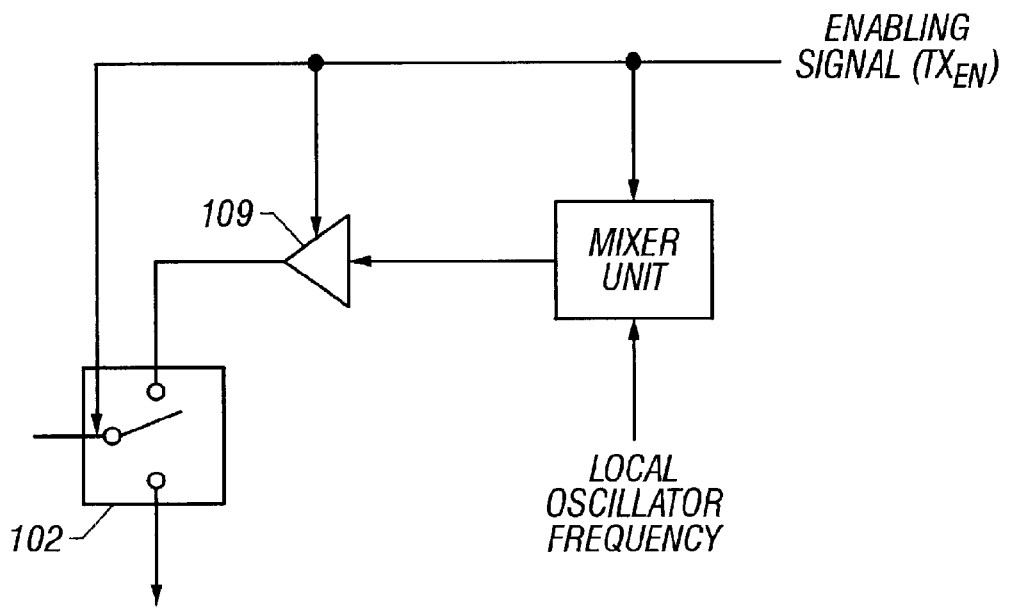
Figure 2B:
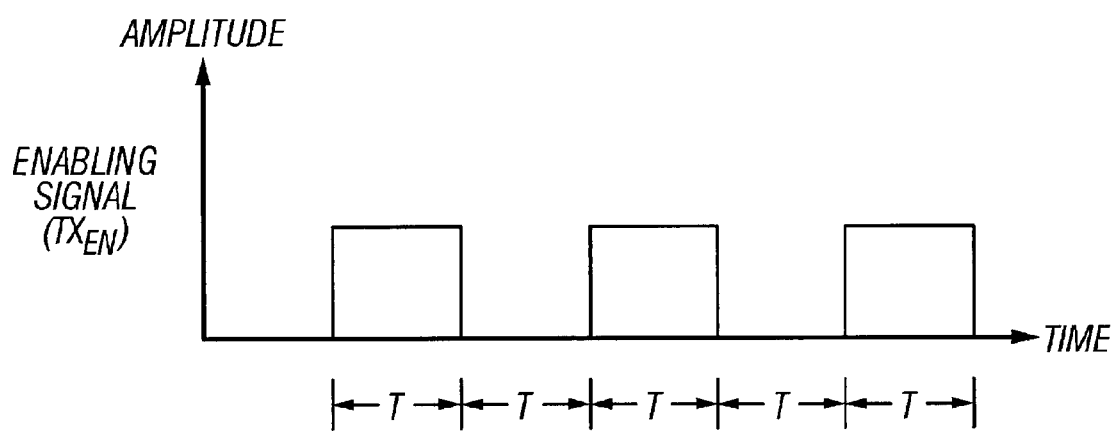
FIG. 2B illustrates of the signal enabling the apparatus of FIG. 2A according to the prior art.
Figure 4A:
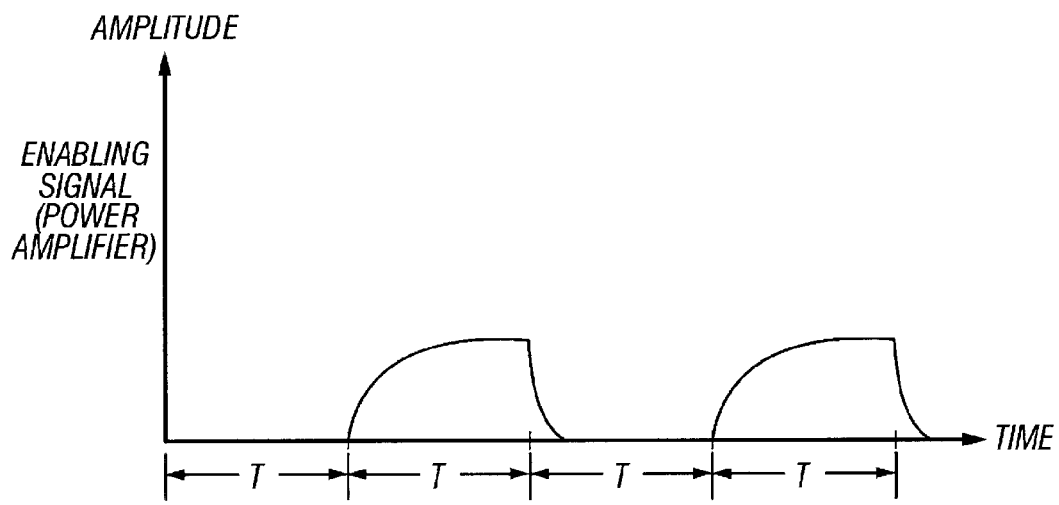
Figure 4B:
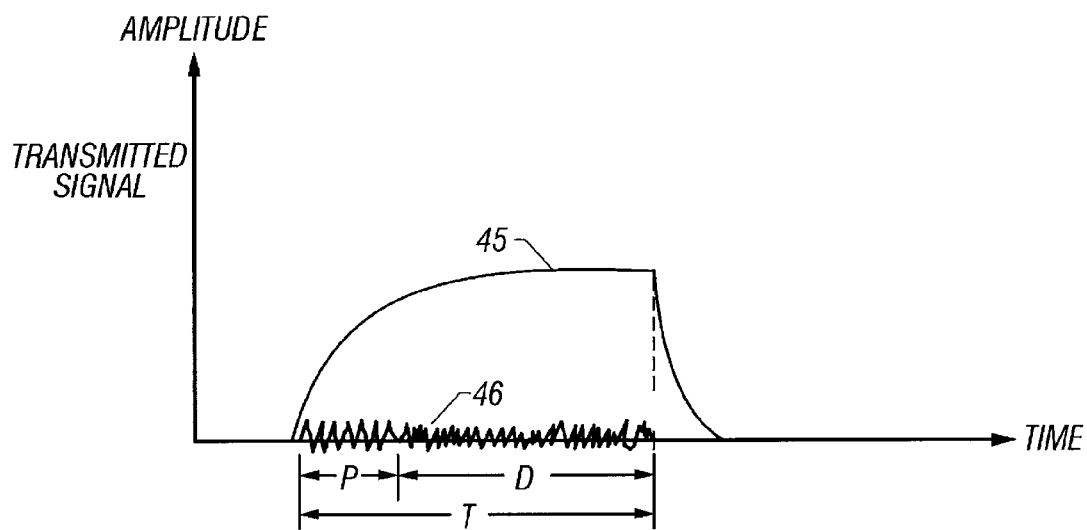
FIG. 4B illustrates the content of the transmitted signal.

Referring to FIG. 4A, a graph illustrating the enabling signal for the power amplifier (and consequently, along with the switch 102, the transmission of a signal) is shown. Instead of an abrupt in the leading edge of the enabling signal such as is shown in FIG. 2B, the enabling signal for the power amplifier 109 has a ramped leading edge. The period T shown in FIG. 4A refers to the time that the switch 102 of FIG. 1A is in the power transmission mode. Referring next to FIG. 4B, the envelope 45 of the transmitted carrier frequency signal (i.e., from the output of power amplifier 109) has a ramped leading edge as a result of the ramped enabling voltage shown in FIG. 4A. The envelope of the transmitted signal will be modulated by information signal 46. The information signal 46, separated in FIG. 4B from the carrier signal 45 for purposes of illustration, has two portions, the preamble portion P and the data portion D. The preamble portion P is typically a periodic signal that has no information encoded therein. The preamble portion P is present during the rising portion of the envelope 45. Because the preamble portion P has no information encoded therein, a communication system receiving that signal does not need to decode this portion of the transmitted signal. The preamble is important because the transmitted signal, during this transition or ramping period, may not be transmitting sufficient signal power for the signal to be decoded accurately by a receiving communication system. Expressed in a different manner, the bit energy during the ramping or transition period of the transmitted frequency envelope is not degraded because the preamble bits are not used in the transfer of data. In the preferred embodiment, the period T(=P+D) is sufficiently long to transmit approximately 80 binary logic signals, the preamble can be 15 binary logic signals in length. The AMD component. AM79440 (an AMD base-band Controller for Spread Spectrum Systems) has protocol that incorporates a preamble that is appropriate for this purpose.

Figure 5A:
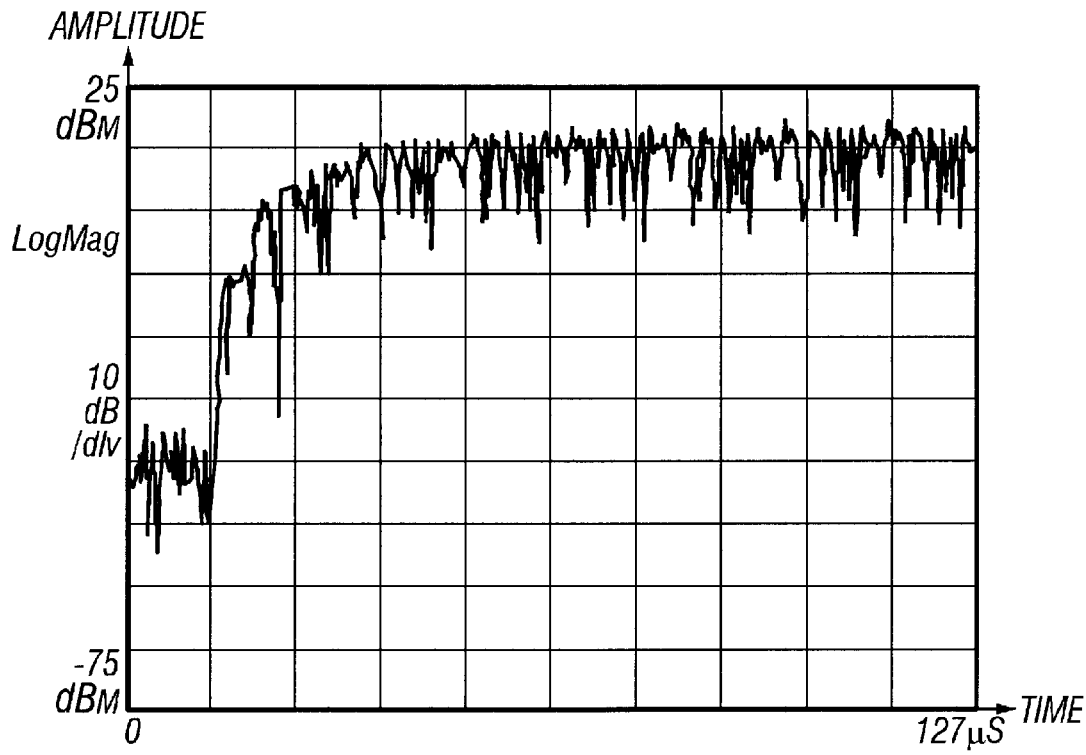
FIG. 5A displays a measurement of the transmitted signal as a result of the ramped transition of power according to the present invention, while FIG. 5B displays a measurement of the noise signal introduced as a result of the ramped introduction of transmitted power according to the prior art.
Figure 5B:
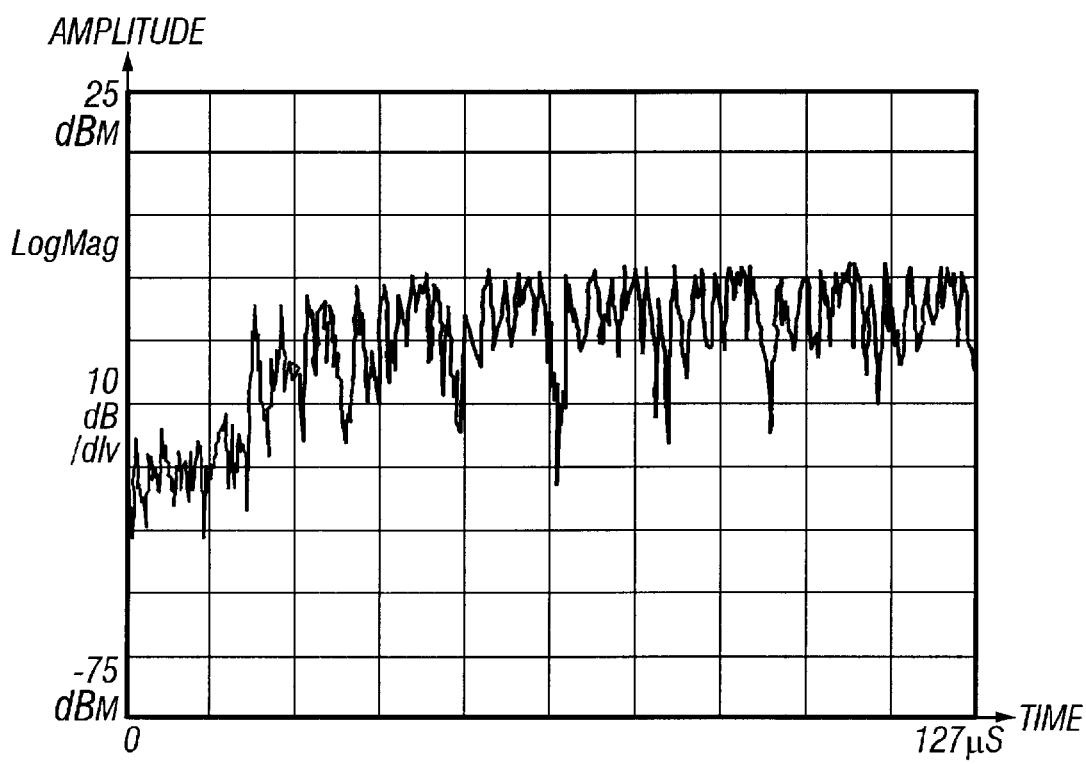

FIG. 5A and FIG. 5B illustrate the effect on the transmitted signal when the power-off to power-on transition is ramped rather than abrupt. In FIG. 5A, the recording of the output signal of a spectrum analyzer at the transmitted signal center frequency (i.e., 904.5 in this measurement) is shown.

Figure 3A:
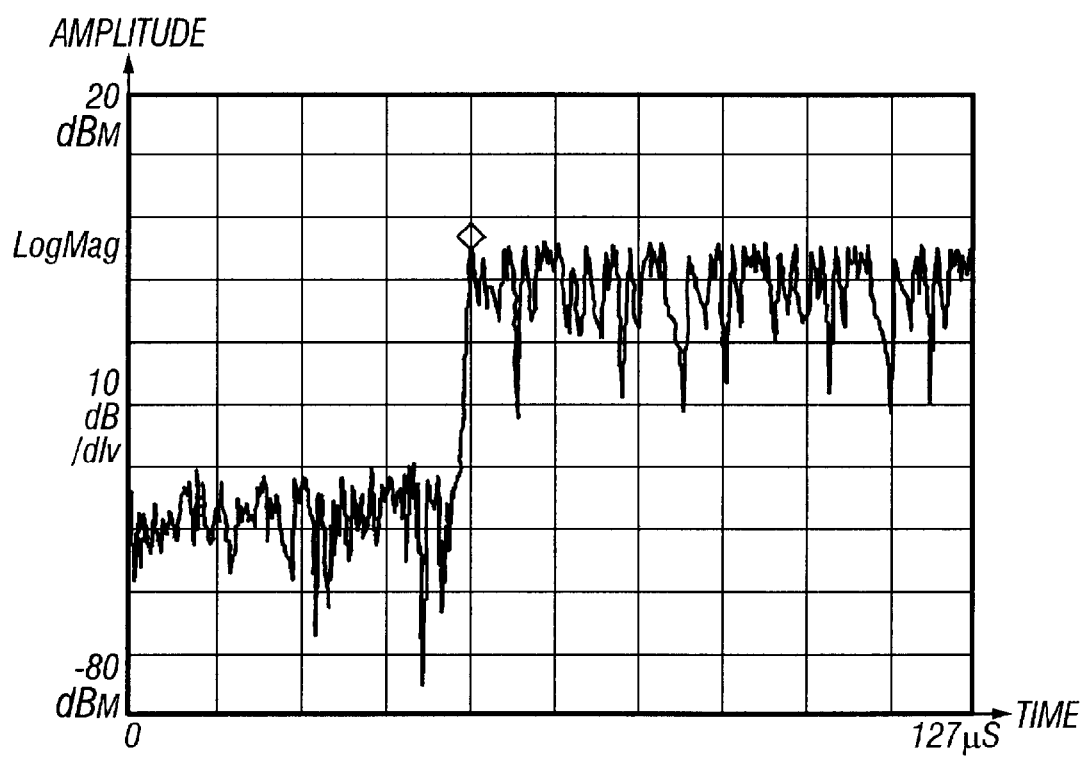
FIG. 3A displays a recording of the transmitted signal resulting from the abrupt transition of the power amplifier in the prior art, while FIG. 3B displays a recording of the noise signal introduced as a result of the abrupt transition of the power amplifier according to the prior art.
Figure 3B:
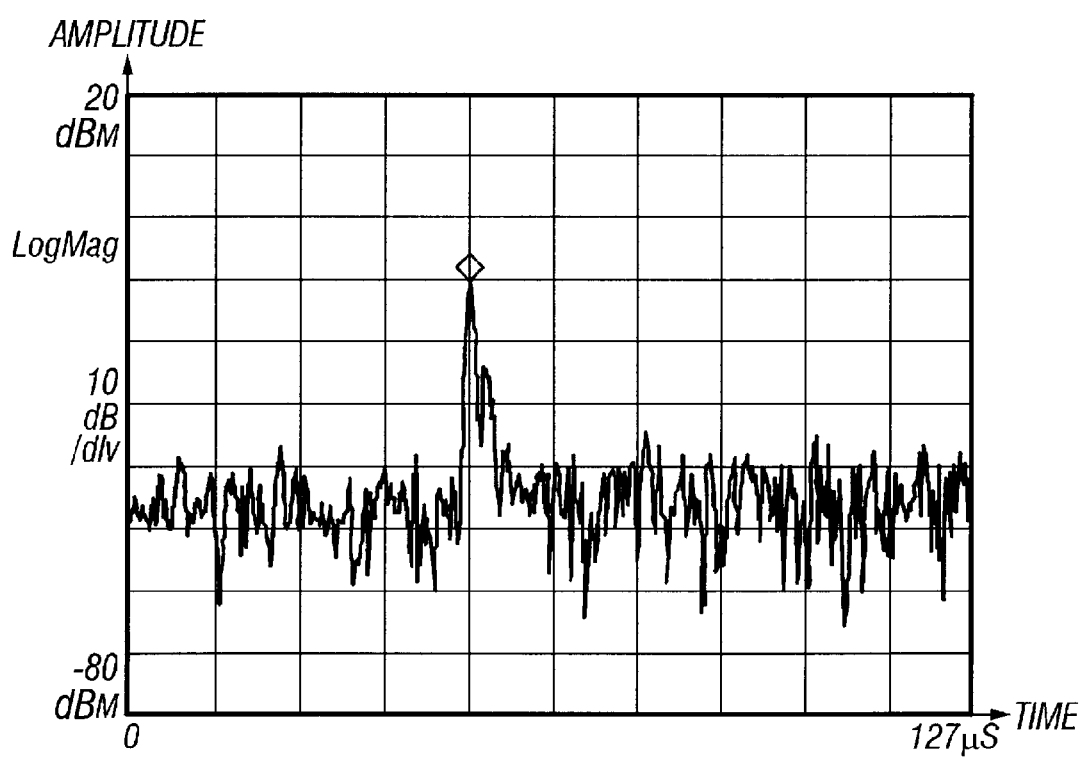

As can be seen by comparison with FIG. 3A, the ramped enabling signal for the power amplifier has eliminated the sharp energy rise the transmitted signal at the center frequency. In FIG. 5B, as in FIG. 3B, the energy spectrum at a frequency 3 MHz from the center frequency of the transmitted signal, as measured by a spectrum analyzer, is shown. In contrast to the measured spectrum in FIG. 3B, the noise spike in the vicinity of the ramping or transition period has been largely eliminated. Consequently, the degradation of the communication system resulting from the noise introduced into the transmission channel as a result of the abrupt transition from a power-off to a power-on mode of operation has been largely eliminated.

Figure 6:
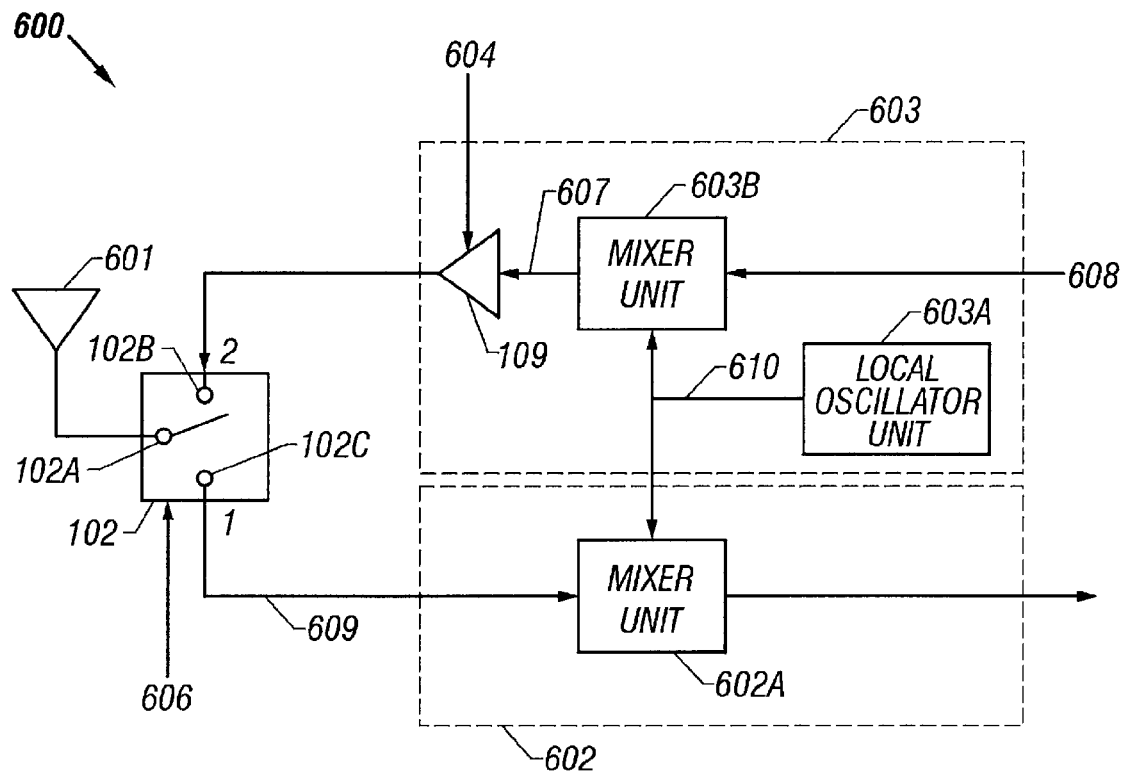
FIG. 6 illustrates at least one embodiment of the invention.

FIG. 6 illustrates at least one embodiment of the invention. The communication system 600 illustrated comprises an antenna 601; a receiving section 602; a transmitting section 603, wherein transmitting section 603 includes a power amplifier 109 having a modulated transmission signal 607 applied thereto, the power amplifier 109 being activated by a first state of an enabling signal 604, the power amplifier 109 being inactivated by a second state of the enabling signal 604, wherein the first state of the enabling signal 604 has a ramped initial portion; and a switch 102 responsive to a first state of a control signal 606 for coupling the receiving section 602 and the antenna 601, the switch 102 responsive to a second state of the control signal 606 for coupling the transmitting section 603 to the antenna 601, wherein the system 600 alternatively transmits and receives transmitted signals, wherein the modulated transmission signal has no modulation during the initial portion of the first state of the enable signal 604; wherein the transmitting section 603 further includes a mixer unit 603B for combining an intermediate frequency data signal 608 and a local oscillator signal 610 to provide the modulated transmission signal 607; and wherein the receiving section includes a mixer unit 602A, the receiving mixer unit combining the received transmitted signal 609 and the local oscillator signal 610.

Figure 7:
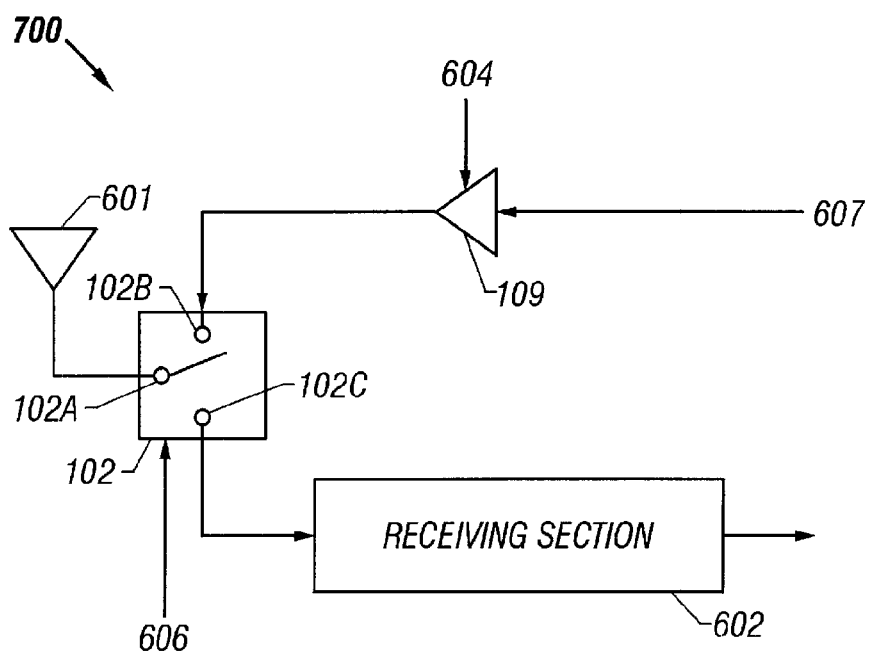
FIG. 7 illustrates at least one embodiment of the invention.

FIG. 7 illustrates at least one embodiment of the invention. The communication system 700 illustrated comprises an antenna 601, a receiving section 602 for receiving and decoding transmitted signals; a switch 102 responsive to a control signal 606 and having an output terminal 102A coupled to the antenna, the switch having a first input terminal 102B coupled to the power amplifier 109, the switch 102 having a second input terminal 102C coupled to the receiving section 602, wherein the switch 102 couples the antenna 601 to the first input terminal 102B in response to a state of the control signal 606, wherein the switch 102 couples the antenna 601 to the second input terminal 102C in response to a second state of the control signal 606; a power amplifier 109 having a modulated carrier frequency signal 607 applied thereto, said power amplifier 109 being activated in response to a first enable signal 604 to amplify the modulated carrier frequency signal 701, the power amplifier 109 being inactivated when the first enable signal 604 is removed, wherein the first enable signal 604 has a ramped profile during an initial portion of the application of the first enable signal 604; and wherein, during the initial portion of the application of the first enable signal 604, the modulated carrier frequency signal 607 has no data encoded therein.

As will be clear from the foregoing discussion, the use of the ramped transition from power-off to power-on for the transmitted signal significantly reduces the noise level. However, at least during the early portion of the transition and possibly extending to the fully power-on portion of the transition, the power of the carrier signal can be inadequate for proper decoding by the receiving communication system. The use of the non-data bearing preamble eliminates this source of error in the channel, but at the cost of slower data transmission.

Those skilled in the art will readily implement the steps necessary to provide the structures and the methods disclosed herein, and will understand that the process parameters, materials, dimensions, and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims. For example, numerous methods of coding and decoding the information modulating the carrier frequency can be used without departing from the present invention. Similarly, the present invention has been illustrated using a duplex communication system. The techniques and apparatus herein described are applicable to any system using intermittent signal transmission.

What is claimed is:

1. In a multiplexed communication system providing alternating transmission and reception of a transmitted signal, a method for reducing the noise introduced into an output signal by a transition from the power-off to a power-on transmission mode, the method comprising:

ramping an envelope of a carrier signal during an initial portion of said transition; and providing a non-data preamble to a signal modulating said carrier signal during said initial portion of said transition.

2. The method as recited in claim 1 wherein said providing step includes the step of providing said non-data preamble for a period longer than said initial portion.

3. The method as recited in claim 1 wherein said ramping step includes the step of applying a ramped enabling signal to a power amplifier.

4. The method as recited in claim 1 wherein said multiplexed system is a duplex communication system.

5. The method as recited in claim 1 wherein the ramping the envelope includes the step of reducing the noise resulting from the initiation of the transmitted signal.

6. A communication system wherein information signals are transmitted periodically, the system comprising:

a power amplifier having a modulated carrier frequency signal applied thereto, said power amplifier being activated in response to a first enable signal to amplify the modulated carrier frequency signal, the power amplifier being inactivated when the first enable signal is removed, wherein the first enable signal has a ramped profile during an initial portion of the application of the first enable signal; and wherein, during the initial portion of the application of the first enable signal, the modulated carrier frequency signal has no data encoded therein.

7. The system as recited in claim 6 wherein the system further comprises:

an antenna;

a receiving section for receiving and decoding transmitted signals; and a switch responsive to a control signal and having an output terminal coupled to the antenna, the switch having a first input terminal coupled to the power amplifier, the switch having a second input terminal coupled to the receiving section, wherein the switch couples the antenna to the first input terminal in response to a first state of the control signal, wherein the switch couples the antenna to the second input terminal in response to a second state of the control signal.

8. The system of claim 7 wherein the first enable signal and the control signal are synchronized.

9. The system of claim 8 wherein the system alternately transmits and receives information.

10. The system of claim 9 wherein the ramped profile of the first enable signal reduces noise generated by the onset of the transmitted signal.

11. A communication system for providing multiplexed transmission and reception of transmitted signals, the system comprising:

an antenna;

a receiving section;

a transmitting section, wherein the transmitting section includes;

a power amplifier having a modulated transmission signal applied thereto, the power amplifier being activated by a first state of an enabling signal, the power amplifier being inactivated by a second state of the enabling signal, wherein the first state of the enabling signal has a ramped initial portion;

a switch responsive to a first state of a control signal for coupling the receiving section and the antenna, the switch responsive to a second state of the control signal for coupling the transmitting section to the antenna, wherein the system alternatively transmits and receives transmitted signals;

wherein the modulated transmission signal has no modulation during the ramped initial portion of the first state of the enable signal.

12. The system of claim 11 wherein the ramped initial portion of the first state of the enable signal results in a continuous increase in the output signal of the power amplifier, thereby reducing the noise introduced into a broadcast band by a rapid increase in a power amplifier output signal.

13. The system of claim 12 wherein the transmitting section further includes a mixer unit for combining an intermediate frequency data signal and a local oscillator signal to provide the modulated transmission signal.

14. The system of claim 13 wherein the states of the control signal and the states of the enable signal are synchronized.

15. The communication system of claim 14 wherein the receiving section includes a mixer unit, the receiving section mixer unit combining the received transmitted signal and the local oscillator signal.

16. The communication system of claim 15 wherein the transmitting section mixer unit is an image reject mixer with a selectable side band.

* * * * *